(12) United States Patent
Orr et al.

(10) Patent No.: US 7,606,552 B2
(45) Date of Patent: Oct. 20, 2009

(54) SYSTEM AND METHOD FOR ACTIVATING AN ELECTRONIC DEVICE

(75) Inventors: Kevin Orr, Elmira (CA); Steven Fyke, Waterloo (CA); David Mak-Fan, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 601 days.

(21) Appl. No.: 11/270,669

(22) Filed: Nov. 10, 2005

(65) Prior Publication Data

US 2007/0102525 A1    May 10, 2007

(51) Int. Cl.
*H04B 1/16* (2006.01)
(52) U.S. Cl. .................. 455/343.1; 455/550.1; 455/572; 340/7.32; 340/669
(58) Field of Classification Search .............. 455/343.1, 455/344, 424, 425, 456.5, 456.6, 561, 550.1, 455/575.1, 574, 572, 127.1, 556.2; 348/154, 348/155; 713/320, 300; 345/156, 158; 715/856–864; 340/522, 554, 567, 7.32, 669, 670, 693.2–693.4
See application file for complete search history.

(56) References Cited

U.S. PATENT DOCUMENTS

| | | | | |
|---|---|---|---|---|
| 3,610,900 A * | 10/1971 | Talwani | ................ | 702/93 |
| 3,886,542 A * | 5/1975 | Ohtsuka | ................ | 341/9 |
| 5,301,130 A * | 4/1994 | Alcone et al. | ................ | 702/141 |
| 5,331,308 A * | 7/1994 | Buccola et al. | ................ | 340/522 |
| 5,656,804 A | 8/1997 | Barkan et al. | | |
| 5,828,987 A * | 10/1998 | Tano et al. | ................ | 702/150 |
| 5,996,080 A * | 11/1999 | Silva et al. | ................ | 713/320 |
| 6,014,103 A * | 1/2000 | Sumner et al. | ................ | 342/457 |
| 6,308,134 B1 * | 10/2001 | Croyle et al. | ................ | 701/220 |
| 6,480,670 B1 * | 11/2002 | Hatano et al. | ................ | 386/109 |
| 6,734,845 B1 | 5/2004 | Nielsen et al. | | |
| 7,040,154 B2 * | 5/2006 | Shaw et al. | ................ | 73/146.5 |
| 7,151,799 B2 * | 12/2006 | Kato et al. | ................ | 375/240.16 |
| 2002/0158448 A1 * | 10/2002 | Okonkwo | ................ | 280/728.2 |
| 2003/0016132 A1 * | 1/2003 | Sudolcan | ................ | 340/568.1 |
| 2004/0069846 A1 * | 4/2004 | Lambert | ................ | 235/382 |
| 2004/0174434 A1 * | 9/2004 | Walker et al. | ................ | 348/211.3 |
| 2005/0022039 A1 * | 1/2005 | Inui et al. | ................ | 713/300 |
| 2005/0164633 A1 * | 7/2005 | Linjama et al. | ................ | 455/41.2 |
| 2005/0212911 A1 * | 9/2005 | Marvit et al. | ................ | 348/154 |
| 2005/0216867 A1 * | 9/2005 | Marvit et al. | ................ | 715/863 |
| 2006/0054708 A1 * | 3/2006 | Koo et al. | ................ | 235/492 |
| 2006/0209803 A1 * | 9/2006 | Rajaniemi et al. | ................ | 370/352 |
| 2006/0235316 A1 * | 10/2006 | Ungless et al. | ................ | 600/509 |
| 2007/0054651 A1 * | 3/2007 | Farmer et al. | ................ | 455/352 |
| 2007/0195074 A1 * | 8/2007 | Gelissen | ................ | 345/204 |
| 2008/0143675 A1 * | 6/2008 | Hsieh et al. | ................ | 345/158 |

\* cited by examiner

*Primary Examiner*—Duc Nguyen
*Assistant Examiner*—Charles Chow
(74) *Attorney, Agent, or Firm*—McCarthy Tétrault LLP

(57) ABSTRACT

The invention provides a system and method for activating an electronic device from a low power state. In the system, an activation circuit for an electronic device is provided. The circuit comprises: a motion sensor circuit; an input device; and a monitoring circuit connected to the input device. The monitoring circuit provides power to the input device when the motion sensor circuit detects a notable movement of the device and selectively generates an activation signal used to activate the electronic device to a higher power state in response to receiving a notable signal received from the input device.

20 Claims, 5 Drawing Sheets

SYSTEM AND METHOD FOR ACTIVATING AN ELECTRONIC DEVICE

The invention described herein relates to a system and method for selectively activating electronic elements in an electronic device. In particular, the invention described herein relates to activating the device from a low-power state by: detecting a notable movement of the device, then determining whether an input device has been activated, then selectively activating or re-activating components in the device.

BACKGROUND OF THE INVENTION

Current wireless handheld mobile communication devices perform a variety of functions to enable mobile users to stay current with information and communications, such as e-mail, corporate data and organizer information while they are away from their desks. A wireless connection to a server allows a mobile communication device to receive updates to previously received information and communications. The handheld devices optimally are lightweight, compact and have long battery life. In order to conserve power consumption of the devices, "sleep" modes are provided which selectively either slow down the clocking rate of the components, selectively de-activate components, or both. However, when in a sleep mode, a re-activation signal can be generated after a certain event (e.g. movement of the device, receipt of a message, etc.) which is used to re-activate the device. Such events can be detected by electronic sensors in the device. However, such sensors need to be continually powered, thereby draining power from the battery.

Processing a re-activation signal also has issues. Prior art devices have fed the re-activation signal to an interrupt request (IRQ) line of a microprocessor in the device. A power-up routine operating on the microprocessor monitors for the activation of the IRQ line and when it is received, the routine causes the microprocessor to power up. The technique can be inefficient for power management, as once the IRQ line is activated, the microprocessor is fully re-activated, thereby draining a significant amount of power. False positive IRQ signals will cause unnecessary re-activations of the microprocessor.

There is a need for a system and method which addresses deficiencies in the prior art.

BRIEF DESCRIPTION OF THE DRAWINGS

The invention will now be described, by way of example only, with reference to the accompanying drawings, in which.

DETAILED DESCRIPTION OF AN EMBODIMENT

Figure 1:
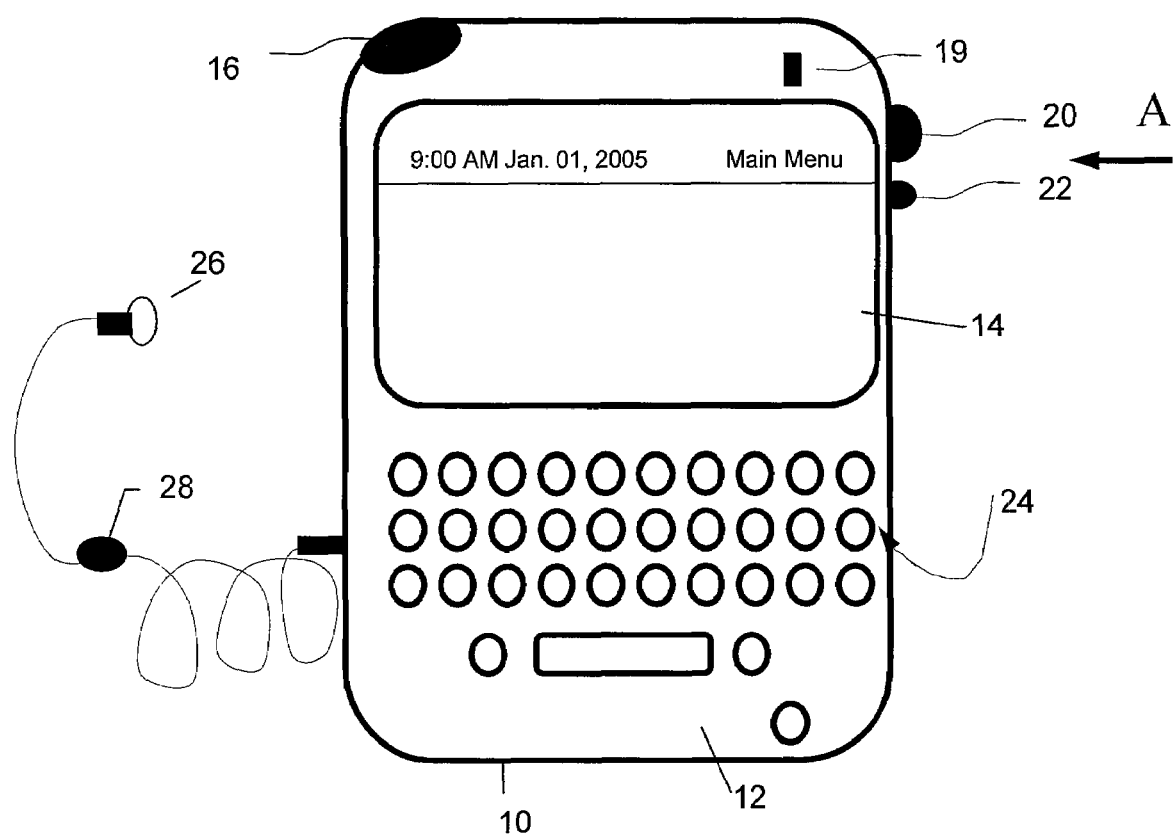
FIG. 1 is a schematic representation of an electronic device having a device activation system in accordance with an embodiment.

The description which follows and the embodiments described therein are provided by way of illustration of an example or examples of particular embodiments of the principles of the present invention. These examples are provided for the purposes of explanation and not limitation of those principles and of the invention. In the description which follows, like parts are marked throughout the specification and the drawings with the same respective reference numerals.

In a first aspect of an embodiment, an activation circuit for an electronic device is provided. The circuit comprises: a motion sensor circuit; an input device; and a monitoring circuit connected to the input device. The monitoring circuit provides power to the input device when the motion sensor circuit detects a notable movement of the device and selectively generates an activation signal used to activate the electronic device to a higher power state in response to receiving a notable signal received from the input device.

The activation circuit may further comprise a microprocessor; a wake-up software routine operating on the microprocessor to selectively bring the electronic device to the higher power state upon receipt of the activation signal; and a timing module to initiate a timing window after detection of the notable movement. Therein, the input device may be activated during the timing window and if a sufficient input signal is provided on the input device during the timing window, the activation signal is generated.

In the circuit, the activation signal may be provided to an interrupt line of the microprocessor which is associated with the wake-up software routine.

In the circuit, a slow clock signal may be generated by the timing module indicating when the microprocessor is in a lower power state.

In the circuit, the motion sensor circuit may comprise a first motion sensor which is continually powered and a second motion sensor which is activated upon receiving an appropriate signal from the first sensor. The circuit may further comprise a threshold circuit connected to the second sensor to filter insignificant signals produced by the second sensor from the monitoring circuit.

In the circuit, the activation signal may also be used to reset the monitoring circuit to allow it to process subsequent signals from the motion sensor.

In the circuit, the input device may be activated by a power signal generated by the monitoring circuit.

In the circuit, the first motion sensor may be an accelerometer.

In the circuit, the input device may detect movement of a finger by a sensor.

In the circuit, if the time window elapses, the power signal for the input device may be removed.

The circuit may further comprise an additional input device connected to the monitoring circuit, providing additional signals to the monitoring circuit for evaluation for generation of the activation signal.

In a second aspect, a method for activating an electronic device is provided. The method comprises: detecting a motion of the device; activating an input device upon detecting the motion if the motion surpasses a predefined threshold; waiting for a notable signal to be received from the input device for a predetermined length of time; and if the notable signal is received within the predetermined time, generating an activation signal for activating the electronic device to a higher power state.

In the method, the step of detecting the motion may comprise utilizing signals from a low-g MEM accelerometer to activate a second accelerometer. Further, the threshold may be set by a threshold circuit having an output from the second accelerometer as an input to the threshold circuit.

In the method, the step of waiting for the notable signal may utilize a slow clock signal to track the predetermined length of time.

The method may further comprise deactivating the input device if the predetermined time elapses without receiving the notable signal from the input device.

In the method, upon generation of the activation signal, it may be provided to a microprocessor associated with the device; and the microprocessor may react to receipt of the activation signal by transiting to a higher power state.

In a third aspect, an electronic device is provided. The device comprises: a microprocessor; a motion sensor circuit; an input device; and a monitoring circuit connected to the input device and an output associated with the second motion sensor. The monitoring circuit provides power to the input device when the motion sensor circuit detects a notable movement of the device and selectively generates an activation signal used to activate the electronic device to a higher power state utilizing a notable signal received from the input device.

The device may further comprise a wake-up software routine operating on the microprocessor to selectively bring the electronic device to the higher power state upon receipt of the activation signal; and a timing module to initiate a timing window after detecting the notable movement. The input device may be activated during the timing window and if a sufficient input signal is provided on the input device during the timing window, the activation signal may be generated.

In the device, the motion sensor circuit may comprise a first motion sensor; a second motion sensor activated by a signal from the first motion sensor; and a threshold circuit connected to the second motion sensor to filter insignificant signals produced by the second motion sensor from the monitoring circuit.

In the device, the activation signal may also be used to reset the monitoring circuit to allow it to process subsequent signals from the second motion sensor.

In other aspects various combinations of sets and subsets of the above aspects are provided.

Referring to FIG. 1, an electronic device for receiving electronic communications in accordance with an embodiment of the invention is indicated generally at 10. In the present embodiment, electronic device 10 is based on a computing platform having functionality of an enhanced personal digital assistant with cellphone and e-mail features. It is, however, to be understood that electronic device 10 can be based on construction design and functionality of other electronic devices, such as smart telephones, desktop computers pagers or laptops having telephony equipment. In a present embodiment, electronic device 10 includes a housing 12, an LCD 14, speaker 16, an LED indicator 19, a trackwheel 20, an ESC ("escape") key 22, keypad 24, a telephone headset comprised of an ear bud 26 and a microphone 28. Trackwheel 20 and ESC key 22 can be inwardly depressed along the path of arrow "A" as a means to provide additional input to device 10.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit switched phone calls. Ear bud 26 can be used to listen to phone calls and other sound messages and microphone 28 can be used to speak into and input sound messages to device 10.

Figure 2:
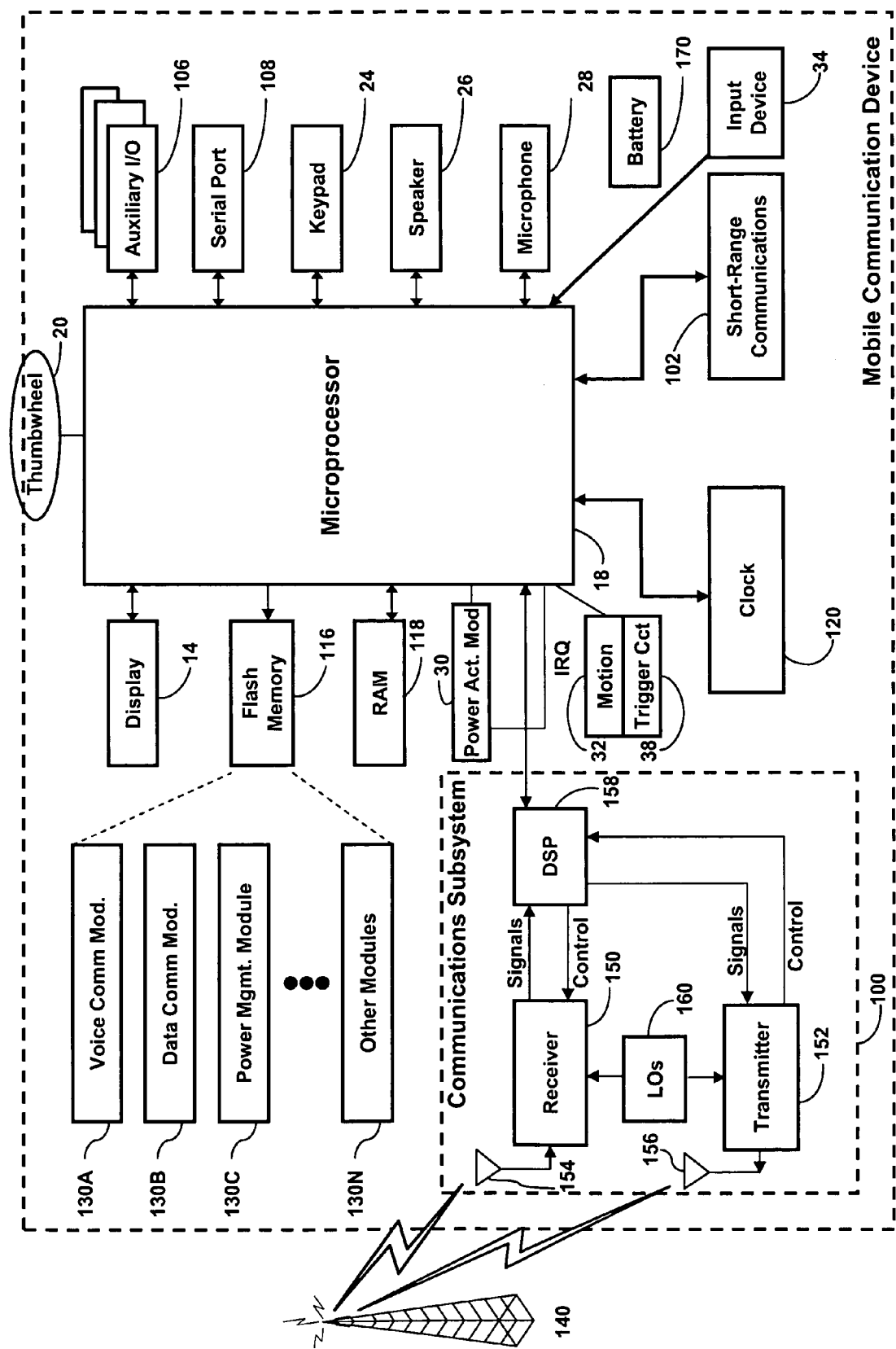
FIG. 2 is a block diagram of certain internal components and the device activation system in the device in FIG. 1.

Referring to FIG. 2, functional components of device 10 are provided. The functional components are generally electronic, structural or electromechanical devices. In particular, microprocessor 18 is provided to control and receive almost all data, transmissions, inputs and outputs related to device 10. Microprocessor 18 is shown schematically as coupled to keypad 24, power activation module 30, motion sensor 32, input device 34 and other internal devices. Microprocessor 18 controls the operation of the power activation module (PAM) 30, as well as the overall operation of the device 10, in response to activation of device 10. Exemplary microprocessors for microprocessor 18 include Data 950 (trade-mark) series microprocessors and the 6200 series microprocessors, all available from Intel Corporation. Microprocessor 18 is connected to other elements in device 10 through a series of electrical connections to its various input and output pins. Microprocessor 18 has an IRQ input line which allows it to receive signals from various devices, including device activation system 30. Appropriate interrupt firmware is provided which receives and reacts to the signals detected on the IRQ line.

In addition to the microprocessor 18, other internal devices of the device 10 are shown schematically in FIG. 2. These include: communication sub-system 100; short-range communication sub-system 102; keypad 24; display 14; auxiliary I/O devices 106; serial port 108; speaker 16; microphone port 112 for microphone 28; flash memory 116 (which provides persistent storage of data); random access memory (RAM) 118; clock 120 and other device sub-systems (not shown). The device 10 is preferably a two-way radio frequency (RF) communication device having voice and data communication capabilities. In addition, device 10 preferably has the capability to communicate with other computer systems via the Internet.

Operating system software executed by the microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications 130 that control basic device operations, such as a voice communication module 130A and a data communication module 130B, may be installed on the device 10 during manufacture or downloaded thereafter. Power management module (PMM) 130C may also be installed on device 10 during manufacture. PMM 130C monitors usage of device 10 and selectively controls power to the components. PMM 130C may also control, in part, PAM 30. As well, additional software modules, illustrated as software module 130N, which may be for instance a personal information manager (PIM) application, may be installed during manufacture or downloaded thereafter into device 10. PIM application is preferably capable of organizing and managing data items, such as e-mail messages, calendar events, voice mail messages, appointments, and task items. Data associated with each application can be stored in flash memory 116.

Communication functions, including data and voice communications, are performed through the communication subsystem 100 and the short-range communication sub-system 102. Collectively, sub-system 102 and sub-system 100 provide the signal-level interface for all communication technologies processed by device 10. Various applications 130 provide the operational controls to further process and log the communications. Communication sub-system 100 includes receiver 150, transmitter 152 and one or more antennas, illustrated as receive antenna 154 and transmit antenna 156. In addition, communication sub-system 100 also includes processing module, such as digital signal processor (DSP) 158 and local oscillators (LOs) 160. The specific design and implementation of communication sub-system 100 is dependent upon the communication network in which device 10 is intended to operate. For example, communication sub-system 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication sub-system 100 provides device 10 with the capability of communicating with other devices using various communication technologies, including instant messaging (IM) systems, text messaging (TM) systems and short message service (SMS) systems.

In addition to processing communication signals, DSP 158 provides control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication sub-system 100 and is provided as an input to microprocessor 18. The received signal is then further processed by microprocessor 18 which can then generate an output to display 14 or to an auxiliary I/O device 106. A device user may also compose data items, such as e-mail messages, using keypad 24, thumbwheel 20 and/or some other auxiliary I/O device 106, such as a touchpad, a rocker switch, a separate thumbwheel or some other input device. The composed data items may then be transmitted over communication network 140 via communication sub-system 100. Sub-system 100 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call related information.

Short-range communication sub-system 102 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. A power switch (not shown) provides an "on/off" switch for device 10. Upon activation of the power switch an application 130 is initiated to turn on device 10. Upon deactivation of the power switch, an application 130 is initiated to turn off device 10. Power to device 10 may also be controlled by other devices and by software applications 130.

It will be appreciated that device 10 can cycle through a normal operating mode to a low-power mode and back to a normal operating mode. In the normal operating mode for device 10, PMM 130C monitors the current state of usage of device 10. When device 10 is detected as being inactive (e.g. no activation of from keypad 24 or no messages received) after a predetermined amount of time (e.g. 5 minutes), then the PMM 130C selectively shuts down an element or places an element of device 10 into a lower power consumption mode. For example, microprocessor 18 may be placed in a "slow clock" mode, wherein the clocking signal for the microprocessor is slowed, thereby causing device 10 to operate slower and conserve battery power. Alternatively, display 14 may be turned off. One or more elements can be selectively powered down. When device 10 is in a low-power mode, device 10 can subsequently be re-activated into the normal power or higher-power mode.

For a low-power mode, the embodiment utilizes the following elements to manage the re-activation of device 10: power activation module 30, motion sensor 32, input device 34, microprocessor 18 and software operating on microprocessor 18. In particular, the elements collectively monitor the state of activation of device 10, monitor signals received from motion sensor 32 and input device 34, then selectively activate components of device 10. Further detail on these elements is provided below.

Figure 3:
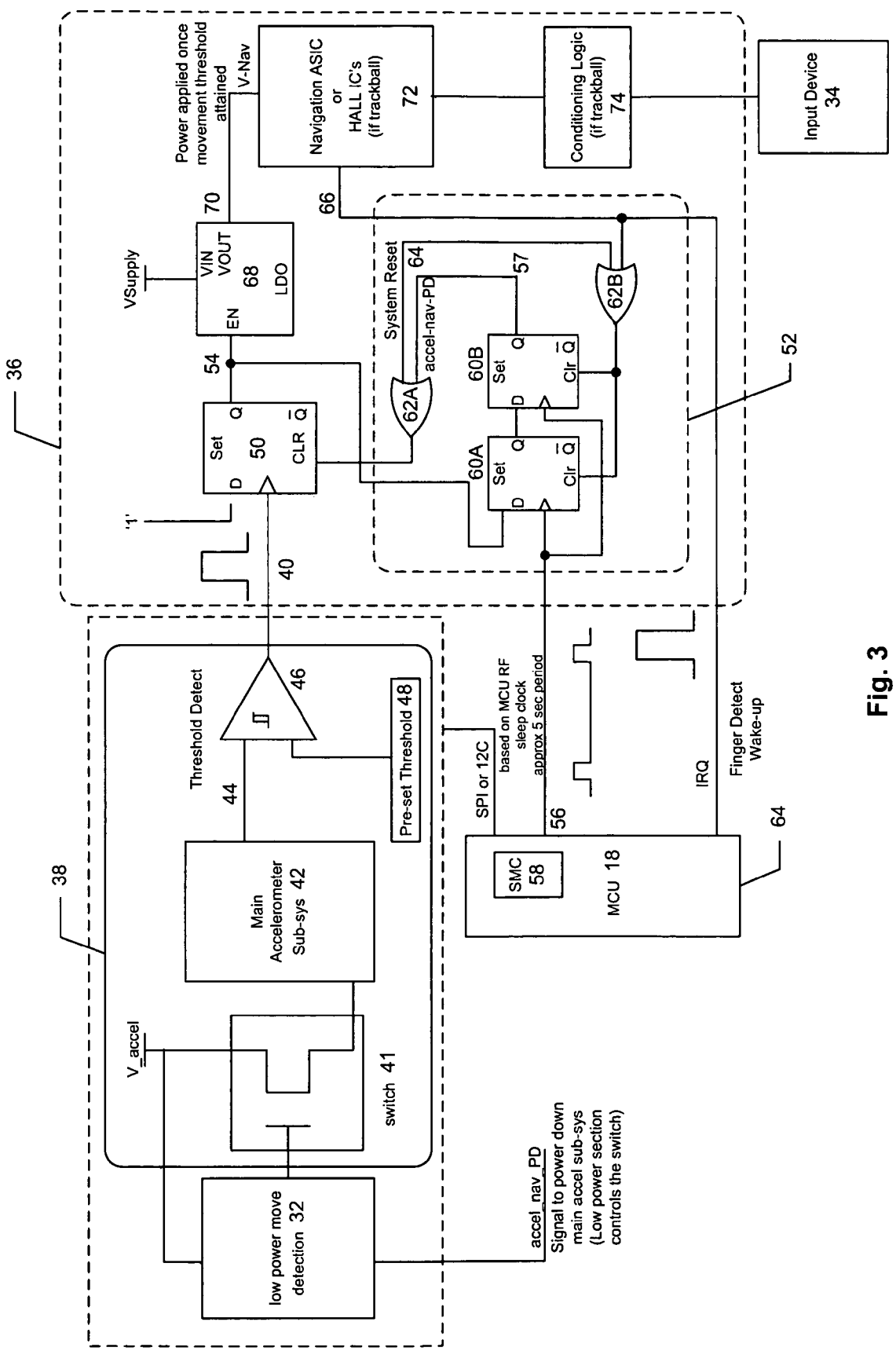
FIG. 3 is a block diagram of the device activation system and its associated elements of the embodiment of FIG. 1.

Turning now to FIG. 3, power activation module 30 comprises two main sections: (1) trigger circuit 38 for use with motion sensor 32; and (2) monitoring circuit 36 for use with input device 34. Briefly, a two-stage approach is used to re-activate device 10. First, trigger circuit 38 is used with motion sensor 32 to detect an initial movement or intent to use device 10. Collectively, trigger circuit 38 and motion sensor 32 may be considered to be a motion sensor circuit. Once the trigger circuit 38 generates its activation signal, monitoring circuit 36 is activated with input device 34 to detect any further indication that the device is meant to be reactivated. Once monitoring circuit 36 determines that device 10 is meant to be re-activated, it sends a re-activation signal to microprocessor 18.

Motion sensor 32 is preferably a motion detection device which utilizes less power in a quiescent state than components in trigger circuit 38 and components in monitoring circuit 36. For example, a low-g MEMs (micro-electromechanical system) accelerometer may be used for motion sensor 32. Further, the accelerometer may be of almost any type, including a capacitive, piezoelectric, piezoresistive, or a gas-based accelerometer. An exemplary low-g MEM accelerometer is a LIS3L02AQ tri-axis analog accelerometer, available from STMicroelectronics of Geneva, Switzerland. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

In FIG. 3, for trigger circuit 38, when accelerometer (also noted by reference number 32) is moved, e.g. by a movement of device 10, the output signal generated by accelerometer 32 is provided to switch 41. If the signal is sufficient to activate switch 41, a power signal from switch 41 is provided to main sub-system 42 to activate it. In one embodiment, sub-system 42 provides a second motion sensor which is activated by the trigger signal from switch 41. As such, when a further movement is detected, the output of the second motion sensor in sub-system circuit 42 is provided to threshold comparator 46. Comparator 46 compares the signal 44 compared by comparator against a threshold value 48. If the size of signal 44 exceeds the threshold value 48, comparator 46 generates activation signal 40. Activation signal 40 represents a "true" activation signal received from sensor 32.

Circuit 38 may be implemented as a single digital device having a series of modules, which can be separately activated and de-activated. A separate "power down" input lines can be associated with main sub-system 42, which would then allow any signals from sensor 32 to be provided directly to the "power down" pin, bypassing switch 41. Similarly, comparator 46 and threshold value 48 may be a second module. A "power-down" pin associated with the threshold module may be tied to the output of main sub-system 42. As such, the output of sensor 32 may be used to provide an input signal to a "power-down" pin in the device. Also, when the main sub-system 42 generates an output signal, it can activate the second module which will then conduct a comparison and generate its output signal. An exemplary integrated device is a LIS3L02DQ tri-axis accelerometer having an I2C or SPI interface, also available from STMicroelectronics. In another embodiment, any of switch 41, sub-system circuit 42, threshold register 48 and comparator 46 may not be provided in the single device.

It will be appreciated that in most instances, depending on motion sensitivities set for sensor 32 and sub-system 42, when device 10 is initially moved from rest, the signal generated by sensor 32 activates sub-system 42 and the signal generated by it is sufficient to trigger the threshold detection circuit 46, to produce signal 40. However, it is possible that the movement of accelerometer 32 is large enough to trigger switch 41, but if the movement may still not be considered to be valid for the remainder of the circuit. For the example, the movement may be too small to be a true activation signal, the movement may have happened too quickly, or the movement may be deemed to be spurious.

Since a digital device typically consumes more power than an analog equivalent, it is advantageous to provide a lower current e.g. piezoelectric sensor, to first detect a movement through sensor 32 and then enable power to the digital accelerometer device to validate the movement. In such an implementation, a digital accelerometer can remain in a power-down mode until required to transition to an active state. Preferably, power to sensor 32 is continually provided. When sensor 32 is implemented as a low-power accelerometer, the draw on battery for device 10 is reduced.

To improve sensitivities of an accelerometer when it is used as motion sensor 32, its outputs can be calibrated to compensate for individual axis offset and sensitivity variations. Calibrations can also could be performed at the system level, providing end-to-end calibration. Calibrations can also be performed by collecting a large set of measurements with the device in different orientations.

Figure 4:
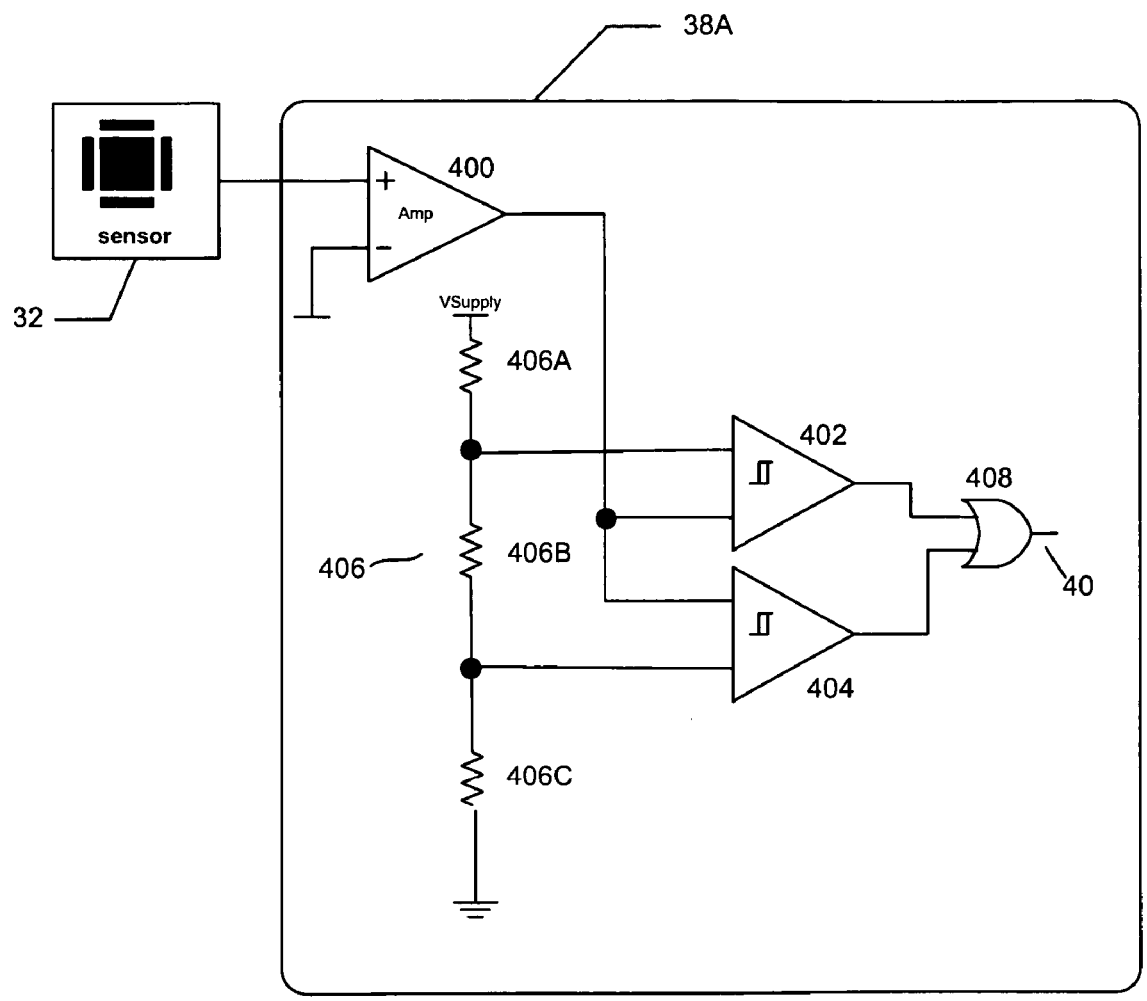
FIG. 4 is a block diagram of an alternative circuit in device activation system of FIG. 3.

Referring to FIG. 4, an alternative circuit 38A is shown for sensor 32 which is aligned as a single axis analog sensor. Sensor 32 can be oriented such that its output detects movement along a desired axis (e.g. 'Z' axis detecting when device moved vertically). Additional axes may be monitored by replicating circuit 38A for each additional axis. Briefly, the output of sensor 32 is provided to buffer amp 400. The output of buffer amp 400 is provided in tandem to comparators 402 and 404. The other inputs of comparators 402 and 404 are taken from different taps on resistor ladder 406, comprising resistors 406A, 406B and 406C. Comparators 402 and 404 each produce upper and lower limit comparison signals for the output of sensor 32. If the value of the signal from sensor 32 is either below the upper limit set by the parameters of comparator 402 (comparing the signal from sensor 32 against its tap from the resistor ladder 406) or above the lower limit set by the parameters of comparator 404 (comparing the signal from sensor 32 against its tap from the resistor ladder 406) then OR gate 408 generates a trigger signal 40. It will be appreciated that the limits can be used to define a range of signals detected by sensor 32 representing when be device 10 is either stationary (e.g. at rest) or being moved.

It will be appreciated that other circuits using different combinations of sensors and triggering components and threshold detectors may be used to provide functionalities of sensor 32 and circuit 38.

For example, if device 10 is lying on a flat, horizontal surface, a trigger condition for the Z-axis of sensor 32 can be set to trigger after detecting a force greater than 1 g. When device 10 is picked up, two changes in velocity are detected along the Z-axis of sensor 32: first, a positive acceleration is detected (e.g. a force greater than 1 g) when device 10 is first picked up and is being raised from the surface; and second, a negative acceleration is detected as device 10 is brought to a given height above the surface and movement of device 10 slows down to hold it at that height. If sensor 32 is a digital device, it preferably produces a positive range of values, for example between 0 and 255, representing all detected up and down movements. In that example, the rest reading for sensor 32 for device 10 may be a value around 127. As such, up and down movements of device 10 would cause readings to move above and below the value of 127. If a movement in either direction is sufficient to trigger one of comparators 402 or 404, the reading on sensor 32 would have to be outside the tolerance window of the rest reading. Thus, OR gate 408 would generate a HIGH when the output signal from sensor 32 is outside the tolerance window. It will be appreciated that the limits of 1 g can be used with a tolerance buffer to compensate for noise in the signals. A comparable analog circuit may be provided if the sensor is producing a voltage signal. In other embodiments, positive and negative values produced by sensor 32 may be analyzed.

Further, if sensor 32 and trigger circuit 38 use only one accelerometer, then the output of OR gate 408 can be used as trigger signal 40. If sensor 32 and trigger circuit 38 use two accelerometers, then the output of OR gate 408 can be used to represent triggers switch 41 or a trigger signal to a Power Down pin of the second accelerometer. In such a circuit, the output of comparators 402 and 404 can be set to be LOW when in the first accelerometer detects movements in only about the 1 g range. Low-pass filtering may also be added to reduce noise and invalid signals being generated by the comparators.

In other embodiments, a single comparator can be used to perform comparisons.

In an embodiment, a specific gesture detected by sensor 32 and/or sub-system 42 may be required to activate device 10, such as a quick "snap" movement in a certain direction of device 10 or the movement of device 10 in a clockwise circular pattern. That gesture can be broken down into a series of sequential notable components. As the gesture is being executed by a user with device 10 in hand, sensor 32 and/or sub-system 42 detects each component of the gesture, and each component is analyzed to determine whether the gesture has been properly formed, thereby providing a signal to activate device 10.

In other embodiments, motion sensor 32 may be substituted with a different device, such as a spring-loaded switch, a keypad, an infrared sensor, a capacitive touch sensor, a proximity sensor, a location sensor, a presence detector, a light sensor or any other device which can generate a signal responsive to a condition predetermined to indicate that device 10 is about to be re-activated. It is preferable that the device have low quiescent power draw characteristics. Further, system notifications, time/date, or alarms may be used to trigger power to be enabled to the input sub-system indicating device reactivation. It will be further appreciated that other motion sensor circuits known in the art may be used, as appropriate.

The second section of circuit 30 provides a further check for activation inputs from additional devices. The second section includes monitoring circuit 36 which interfaces with device 34. Briefly, monitoring circuit 36 checks for signals from input device 34 and then, if deemed appropriate signals are received, additional activation signal(s) are generated. The additional activation signals can be provided to microprocessor 18 as a wake-up signal to cause microprocessor 18 to initiate a reactivation routine. Ultimately, a sufficient signal from device 34 is still needed before the wake-up signal for microprocessor 18 are generated.

Input device 34 is any device which allows the user of device 10 to provide some form of input to device 10. It can be a keypad, a touchscreen, a touchpad, a touchstrip, a trackball, a fingerprint reader, a mouse, a trackwheel, a joystick, a switch, a motion sensor, a light sensor, a microphone, an IR sensor, an accelerometer or any other input device. Preferably, input device 34 can detect movement of a finger of the user across its sensor. The description of device 10 has already noted keypad 24, trackwheel 20, ESC key 22, auxiliary I/O devices 106, microphone 28 as separate devices. However, it will be appreciated that any one of those devices are also input devices and can be used as input device 34.

For monitoring circuit 36, a system reset signal is provided after device power-up to clear the Q outputs of latches 54 and 60. After microprocessor 18 initializes, it will enter its sleep state after a period of inactivity. Its sleep state will be provisioned by a slow clock signal. A free-running TIMED_REF_CLK signal 56 is provided from microprocessor 18 based on the slow clock. The shape of signal 56 can be defined to meet different requirements. One pulse can be a short pulse generated every 5 seconds. Preferably, microprocessor 18 generates signal 56 only when it is asleep. In other embodiments, TIMED_REF_CLK signal 56 may be generated by a separate timer circuit (not shown) independently from microprocessor 18.

First, activation signal 40 is provided to latch 50. Reset circuit 52 provides a pre-condition for allowing trigger signal 54 to be generated. One condition is that microprocessor 18 be active, but in a low-power state. In the embodiment, when microprocessor 18 is in a low-power state, a slow clock signal is provisioned by the microprocessor to be able to respond to remote, radio frequency requests, user requests, alarms, etc. Typically this slow clock is provided by an external oscillator which feeds slow clock module 58. The slow clock signal has a slower clocking rate than the normal clocking signal used by microprocessor 18. The TIMED_REF_CLK signal 56 is derived from a timer which is clocked by slow clock module 58 in microprocessor 18. TIMED_REF_CLK signal 56 may have a duty cycle which has a shorter "ON" cycle compared to its "OFF" cycle. Monitoring circuit may be implemented to monitor for the edge or level of signal 56.

To process the conditions for generating trigger signal 54, time window generation and reset circuit 52 comprises a series of staged latches 60A and 60B and OR gates 62A and 62B. TIMED_REF_CLK signal 56 is fed as an input to time window generation and reset circuit 52. The output of time window generation and reset circuit 52 is provided to the CLR line of latch 50. TIMED_REF_CLK signal 56 is used as the clocking signal for latches 60A and 60B. The data line of latch 60A comes from the output of latch 50. The output of latch 60A is fed to the data line of latch 60B. The output of latch 60B is pulse 57 defined by two upward edges of TIMED_REF_CLK signal 56 and is fed to OR gate 62A.

A system reset signal 64 from microprocessor 18 is provided as a second input to OR gate 62A. The output of OR gate 62A is provided to latch 50 CLR. The output of OR gate 62B is provided to the CLR lines of gates 60A and 60B. The inputs of OR gate 62B are provided by the system reset signal 64 and the wakeup signal 66 provided by monitoring circuit 38. As such, the setting and resetting of trigger signal 54 is mainly controlled by: (1) the state of activation signal 40; (2) the state of TIMED_REF_CLK signal 56 (represented by pulse 57); (3) the state of reset signal 64; and (4) the state of the wake-up signal 66. For the case where the wake-up signal 66 is OFF (i.e. it not been activated), a state table of the signals is provided in Table A:

TABLE A

| Inputs | | | Output |
|---|---|---|---|
| Reset Signal 64 | Pulse 57 | Activation Signal 40 | Trigger Signal 54 |
| OFF | OFF | OFF | OFF |
| OFF | OFF | ON | OFF |
| OFF | ON | OFF | OFF |
| OFF | ON | ON | ON |
| ON | OFF | OFF | OFF |
| ON | OFF | ON | OFF |
| ON | ON | OFF | OFF |

As such, it will be seen that the only instance where trigger signal 54 is generated as an ON signal if the reset signal 64 is OFF (i.e. not active), the duty cycle of the slow clock is ON (i.e. active), and the activation signal is ON and the signal of pulse 57 is in its open window. The system reset signal 54 may be provided by microprocessor 18 or any other device. Generally, it is generated in situations where a large failure has occurred, required the reset of device 10.

In other embodiments, the above noted state diagram may be implemented in other circuits, PLDs, PLAs, software, firmware or other systems known in the art. Further, other types of trigger circuits employing more or less input signals, as required, may be provided in other embodiments. Also, in other embodiments different condition signals may be used from one or more different devices in evaluating whether to generate trigger signal 54.

In monitoring circuit 36, trigger signal 54 is provided to enable voltage regulator 68 to control the current of the output signal. If trigger signal 54 is ON, then output signal 70 of voltage regulator 68 will be HIGH, i.e. the output voltage of the regulator. The output signal 70 is used to activate any necessary power circuits for input device 34. It will be seen that use of the first and second sections provides a staged power-up routine for device 34. In another embodiment, Navigation ASIC/module 72 is provisioned with a Power Down pin, which must be asserted before module 72 is powered. In certain configurations, use of a Power Down pin for module 72 would allow voltage regulator 68 to be eliminated.

With device 34 activated, circuit 36 can monitor and evaluate any signals received from of device 34. These functions are provided by navigation ASIC 72, which is also activated by output signal 70. Navigation circuit 72 receives signals generated by input device 34 and has logical circuits (not shown) which evaluates the signals. In a comparable fashion for signals from motion sensor 32, navigation circuit 72 may evaluate the signals and may require them to be of a certain direction, force, duration, speed or any combination of those characteristics to be considered a signal which is meant to turn on device 10. Again, a specific gesture signal may be required, such as the movement of input device 34 in a circular fashion. Navigation circuit 72 may also process any signals from input device 34 when device 10 is operating in a full-power mode.

Similar to an embodiment having modules in a single device for motion detector 32 and circuit 38, circuit 36 may be implemented as a monolithic digital device having one, two or more modules. Each module may have a separate power down pin, providing individual control over power over individual modules. As such, an output from ASIC 72 may be used to control a power down pin for conditioning logic circuit 74. Similarly reset circuit 52 may have its output tied to power down pins of latch 50.

Pulse 57 defines a timed window controlled by TIMED_REF_CLK signal 56, 60A and 60B. The window may be used to selectively activate navigation circuit 72, allowing it to monitor for an input signal from device 34. Power is provided to circuit 72 when the window is open. If no sufficient signal from input device 34 is received in the window, power to navigation circuit 72 and/or device 34 may be reduced or turned off. The window may be any duration, such as 5, 10, 20, or 30 seconds. If after activation from signal 54, navigation circuit 72 does not respond via an IRQ within the window period derived by TIMED_REF_CLK then signal 60B will be clocked by the second occurrence of TIMED_REF_CLK which will place a HIGH on the CLR of latch 50 and disable power to navigation circuits. If a higher power accelerometer is used (separate from the low power move detect 32) or if the accelerometer contains a higher power section that may be powered down independently (example: digital section), then the accelerometer may be placed in a power down mode as well.

When navigation circuit 72 determines that an acceptable signal has been received from input device 34, circuit 72 generates wake-up signal 66. As noted earlier, the wake-up signal is provided to OR gate 62B of reset circuit 52. It is also provided to the IRQ line of microprocessor 18. An interrupt routine is provided for microprocessor 18 which is activated upon the receipt of the wakeup signal 66 on the IRQ line. The microprocessor, once awakened by the IRQ signal, will disable the TIMED_REF_CLK signal 56 to prevent powering down of navigation circuit 72 via CLR of 50. When the system returns back to a sleep state because of user inactivity, the TIMED_REF_CLK is re-enabled. Alternatively, microprocessor 18 may provide an output signal (once awakened) that feeds OR gate 62B input instead of signal 66. Microprocessor 18 would set this signal HIGH until ready to re-enter sleep state to inhibit the disabling of the navigation ASIC/module.

The logic and technologies for navigation circuit 72 may be implemented as an ASIC, a PLD, discrete elements, a PLA or any other technologies known in the art. It will be appreciated that various different implementations can be made for navigation circuit 72, depending on the re-activation requirements made for device 10. For example, navigation circuit 72 may monitor for signals from one or more input devices 34. For specific types of input devices 34, such as a trackball, navigation circuit 72 may be implemented as a Hall effect circuit. Further, a specific signal sequence may be required from one or more input devices 34 in order for navigation circuit 72 to generate wake-up signal 66. Alternatively, the re-activation requirements may be more modest. For example, signal 66 may be generated after any signal is detected from device 34. Conditioning module 74 also can be provided between input device 34 and navigation circuit 72 to debounce or filter any deemed spurious signals generated by input device 34.

When wake-up signal 66 is provided to an IRQ line of microprocessor 18, microprocessor 18 activates the associated interrupt routine. The interrupt routine contains instructions to re-activate microprocessor 18 and initiate other processes and routines to move device 10 from its current power-up state to another, higher-power up state. The routine is encoded as software or firmware and may be stored in an appropriate memory location in memory 116. The next power state may be a full-power state or it may be an enhanced power state. Further progression up or down from the next power state may be dependent on further detection of use of device 10 by circuit 30 or an additional circuit.

Figure 5:
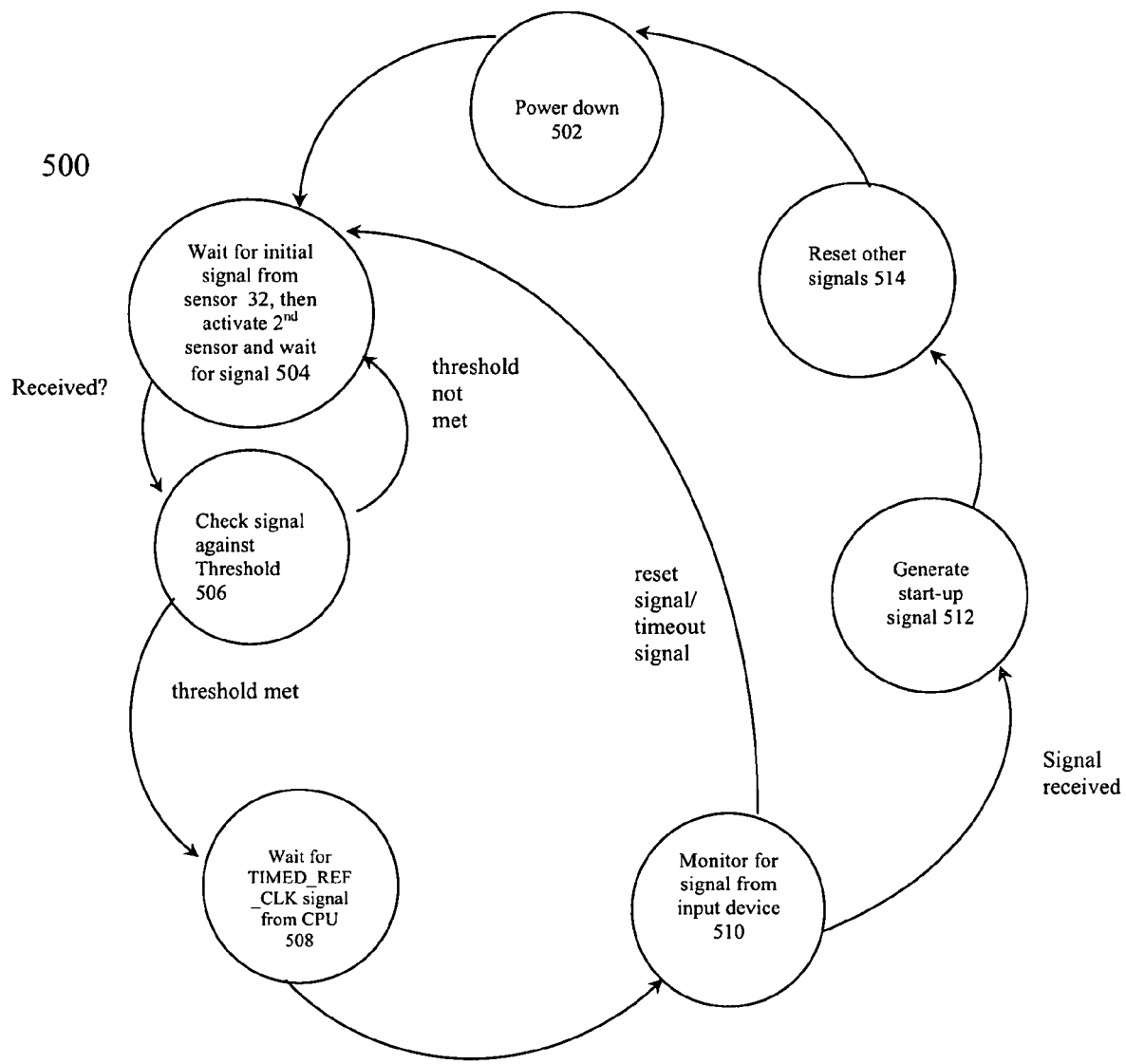
FIG. 5 is a state diagram of a device activation routine executed by the embodiment of FIG. 1.

Referring to FIG. 5, state diagram 500 shows a progression of states passed during monitoring and execution of a power-up sequence routine for device 10. Initial state 502 is entered when device 10 enters a lower-power state. The system immediately transfers to Wait for Signal from Sensor state 504, which monitors for any initial trigger signal from sensor 32. If the trigger is received, then the second sensor in sub-system 42 is activated and the system waits for a trigger from the second sensor. If a trigger is received, the system moves to state 506, where the trigger is evaluated to whether it has passed all imposed thresholds, if any. If all thresholds are passed, the system moves to state 508. If all thresholds are not passed, then the system returns to state 504.

In state 508, device 10 waits for a TIMED_REF_CLK clock signal from microprocessor 18. Other activation signals could be used. Once the activation signal is received, the system moves to state 510, the main monitoring state. Here, the state will wait for one of three triggers: (1) receipt of a signal from input device 34; (2) receipt of any time out signal from the monitoring circuit; or (3) receipt of any reset signal, such as a reset signal from a CPU 18. If a signal is from input device 34, the system transits to state 512, otherwise it transits back to state 504. In state 512, a wake-up signal is generated and sent to the system, such as microprocessor 18, so that a transition to higher power level may occur. The system then automatically transits to state 514 where signals are reset. Then the system transits to power down state 502. It will be appreciate that various implementations using techniques known in the art can be used to implement all or parts of the system flow shown in FIG. 5. For example, a combination of hardware, software and firmware elements can implement one or more monitoring and signal generation features described herein. It will further be appreciated that different embodiments may utilize selected certain features of the algorithm shown in FIG. 5. Alternatively, different branches may be provided or additional wait times and threshold steps may be added.

It will be appreciated that with careful selection of motion sensor 32 and input device 34, less power may be drawn by device 10 when it is in low-power mode and is simply waiting for device 10 to be activated, based mostly on signals from low-power sensor 32 instead of higher-power input device 34.

It will further be appreciated that the several layers of filtering of signals generated by PAM 30 ensure that the ultimate wake-up signal 66 is not spurious. This lessens the possibility of awakening microprocessor 18 incorrectly and wasting power for its re-activation.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. An activation circuit for an electronic device, comprising:
   a first accelerometer;
   a second accelerometer which is activated upon receiving a movement signal from said first accelerometer, indicating a movement of said electronic device;
   a threshold circuit connected to an output of said second accelerometer to allow only signals generated by the second accelerometer that exceed a threshold to pass;
   an input device; and
   a monitoring circuit connected to said input device and the output of said second accelerometer, providing power to said input device when said threshold circuit passes said signal to monitoring circuit and thereafter the monitoring circuit selectively generates an activation signal to activate said electronic device to a higher power state utilizing a notable signal received from said input device.

2. The activation circuit as claimed in claim 1, further comprising:
   a microprocessor;
   a wake-up software routine operating on said microprocessor to selectively bring said electronic device to said higher power state upon receipt of said activation signal; and
   a timing module to initiate a timing window after detection of said notable movement,
   wherein said monitoring circuit for said input device is activated during said timing window and if a sufficient input signal from said input device is detected by said monitoring circuit during said timing window, said activation signal is generated.

3. The activation circuit as claimed in claim 2, wherein said activation signal is provided to an interrupt line of said microprocessor which is associated with said wake-up software routine.

4. The activation circuit as claimed in claim 3, wherein a slow clock signal is generated by said timing module indicating when said microprocessor is in a lower power state.

5. The activation circuit as claimed in claim 1, wherein said activation signal is also used to reset said monitoring circuit to allow it to process subsequent signals from said second accelerometer.

6. The activation circuit as claimed in claim 1, wherein said input device is activated by a power signal generated by said monitoring circuit.

7. The activation circuit as claimed in claim 1, wherein said input device detects movement of a finger by a sensor.

8. The activation circuit as claimed in claim 7, wherein if said time window elapses, said power signal for said input device is removed.

9. The activation circuit as claimed in claim 8, further comprising an additional input device connected to said monitoring circuit, providing additional signals to said monitoring circuit for evaluation for generation of said activation signal.

10. The activation circuit as claimed in claim 1, wherein said first accelerometer is a low-g MEM accelerometer.

11. A method for activating an electronic device, comprising:
    monitoring for signals from a low-g MEM accelerometer to indicate an initial movement of said device and then activating a second accelerometer;
    monitoring for signals from said second accelerometer and then activating an input device if a signal from said second accelerometer surpasses a predefined threshold;
    waiting for a notable signal to be received from said input device for a predetermined length of time;
    if said notable signal is received within said predetermined time, generating an activation signal for activating said electronic device to a higher power state; and
    if said notable signal is not received within said predetermined time, deactivating said input device and said second accelerometer.

12. The method for activating an electronic device 11, wherein:
    said step of waiting for said notable signal to be received from said input device utilizes a slow clock signal to track said predetermined length of time.

13. The method for activating an electronic device 11, further comprising:
    deactivating said input device if said predetermined time elapses without receiving said notable signal from said input device.

14. The method for activating an electronic device 11, wherein:
    upon generation of said activation signal, it is provided to a microprocessor associated with said device; and
    said microprocessor reacts to receipt of said activation signal by transiting to a higher power state.

15. The method for activating an electronic device 11, further comprising:
    using said activation signal to reset a monitoring circuit associated with said second accelerometer to allow said monitoring circuit to process subsequent signals from said second accelerometer.

16. The method for activating an electronic device 11, wherein said input device detects movement of a finger by a sensor.

17. An electronic device, comprising:
    a microprocessor;
    a first accelerometer;
    a sensor second accelerometer, activated by a signal from said first accelerometer;
    a threshold circuit connected to said second accelerometer to filter insignificant signals produced by said second accelerometer;
    an input device; and
    a monitoring circuit connected to said input device and an output associated with said threshold circuit, providing power to said input device when said threshold circuit detects a notable movement of said device and selectively generating an activation signal used to activate said electronic device to a higher power state utilizing a notable signal received from said input device.

18. The electronic device as claimed in claim 17, further comprising:
    a wake-up software routine operating on said microprocessor to selectively bring said electronic device to said higher power state upon receipt of said activation signal; and
    a timing module to initiate a timing window after detection of said notable movement, wherein said input device is activated during said timing window and if a sufficient input signal is provided on said input device during said timing window, said activation signal is generated.

19. The electronic device as claimed in claim 18, wherein said activation signal is also used to reset said monitoring circuit to allow it to process subsequent signals from said second accelerometer.

20. The electronic device as claimed in claim 17, wherein said first accelerometer is a low-g MEM accelerometer.

* * * * *

UNITED STATES PATENT AND TRADEMARK OFFICE
CERTIFICATE OF CORRECTION

PATENT NO. : 7,606,552 B2  Page 1 of 1
APPLICATION NO. : 11/270669
DATED : October 20, 2009
INVENTOR(S) : Orr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 768 days.

Signed and Sealed this

Fourteenth Day of December, 2010

David J. Kappos
*Director of the United States Patent and Trademark Office*